(12) United States Patent
Jöngren et al.

(10) Patent No.: US 9,264,121 B2
(45) Date of Patent: Feb. 16, 2016

(54) EFFICIENT UTILIZATION OF CONTROL CHANNELS IN A COMMUNICATION SYSTEM

(75) Inventors: George Jöngren, Stockholm (SE); Bo Göransson, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1034 days.

(21) Appl. No.: 12/867,189

(22) PCT Filed: Oct. 28, 2008

(86) PCT No.: PCT/SE2008/051218
§ 371 (c)(1),
(2), (4) Date: Aug. 11, 2010

(87) PCT Pub. No.: WO2009/102251
PCT Pub. Date: Aug. 20, 2009

(65) Prior Publication Data
US 2010/0315969 A1    Dec. 16, 2010

Related U.S. Application Data

(60) Provisional application No. 61/028,050, filed on Feb. 12, 2008.

(51) Int. Cl.
*H04W 24/00*    (2009.01)
*H04B 7/06*    (2006.01)
*H04B 7/04*    (2006.01)

(52) U.S. Cl.
CPC ............ *H04B 7/0639* (2013.01); *H04B 7/0417* (2013.01); *H04B 7/063* (2013.01); *H04B 7/0632* (2013.01)

(58) Field of Classification Search
CPC .. H04B 7/0417; H04B 7/0639; H04B 7/0632; H04B 7/063
USPC ......................................................... 370/252
See application file for complete search history.

(56) References Cited

U.S. PATENT DOCUMENTS

2007/0217540 A1    9/2007    Onggosanusi et al.
2008/0219370 A1*   9/2008    Onggosanusi et al. ....... 375/260
(Continued)

FOREIGN PATENT DOCUMENTS

WO    2008/154201 A2    12/2008

OTHER PUBLICATIONS

3rd Generation Partnership Project. "CQI and PMI Resource Management." RSG RAN WG1 meeting #50bis, R1-074233, Shanghai, China, Oct. 8-12, 2007.
3rd Generation Partnership Project. "E-UTRA PUCCH: ACK/NACK, CQI, PMI, and RI Issues." 3GPP TSG RAN WG1 Meeting #50bis, R1-074391, Shanghai, China, Oct. 8-12, 2007.
3rd Generation Partnership Project. "Details on CQI Format." 3GPP TSG-RAN WG1 #51, R1-074971, Jeju, Korea, Nov. 5-9, 2007.
(Continued)

*Primary Examiner* — Luat Phung
(74) *Attorney, Agent, or Firm* — Coats & Bennett, P.L.L.C.

(57) ABSTRACT

A method and arrangement in a first node (110) for sending feedback data on a feedback channel (121) to a second node (111) is provided. The feedback data is indicative of channel properties of a data channel (120) for sending data from the second node (111) to the first node (110). A wireless MIMO communications system (100) comprises the first and second nodes (110, 111). The first node (110) sends (420), in a time period of the feedback channel (121), feedback data comprising a first rank indicator of the data channel (120). Furthermore, the first node (110) sends additional data (212, 242) being independent of the first rank indicator in the time period. Moreover, a corresponding method and arrangement in a second node (111) for receiving feedback data on a feedback channel is provided.

18 Claims, 4 Drawing Sheets

(56) References Cited

U.S. PATENT DOCUMENTS

2009/0067391 A1* 3/2009 Shen et al. .................. 370/336
2009/0196366 A1* 8/2009 Shen et al. .................. 375/260
2009/0201825 A1* 8/2009 Shen et al. .................. 370/252
2010/0183086 A1* 7/2010 Ko et al. ..................... 375/260

OTHER PUBLICATIONS

3rd Generation Partnership Project. "Corrections to CQI and RI Fields Description." 3GPP TSG-RAN Meeting #55bis, R1-090533, Ljubljana, Slovenia, Jan. 12-16, 2008.

* cited by examiner

EFFICIENT UTILIZATION OF CONTROL CHANNELS IN A COMMUNICATION SYSTEM

FIELD OF THE INVENTION

The present invention relates to methods and arrangements in a wireless communication system, in particular to feedback of rank indication.

BACKGROUND

For a typical MIMO system supporting precoding and rank adaptation, a transmitter, comprised in the system, need information about the current channel rank (rank indicator-RI), preferred precoder matrix indicator (PMI) and channel quality indicator (CQI) from terminals (or mobile terminals), comprised in the system. This information can either be jointly transmitted in a feedback channel, such as PUCCH (Physical Uplink Control Channel), or the information can be separately transmitted either in different time intervals or even on different physical channels.

There can be reasons for separating, at least rank information from CQI/PMI information. One reason is that it is believed that the channel rank varies more slowly than the channel quality. Since the PMI is strongly connected to the CQI, for a certain channel realization, different precoders will result in different CQI. Another reason can be that the pure size of the control data (RI+CQI+PMI) will limit the range of the control channel, i.e. too many physical bits should be transmitted in a certain time frame.

Hence, it is a problem that the rank information is sent more often than necessary, and that the control data includes more bits than the number of bits in a certain time frame, resulting in an inefficient use of the control channel.

It should also be noted that the format of the CQI/PMI report will depend on the rank.

The document OUALCOMM EUROPE: "Details on CQI Format" 3GPP DRAFT; R1-074971, 3RD GENERATION PARTNERSHIP PROJECT (3GPP), MOBILE COMPETENCE CENTRE; 650, ROUTE DES LUCIOLES; F-06921 SOPHIA-ANTIPOLIS CEDEX; FRANCE, vol. RAN WG1, no. Korea; 20071105, 29 Oct. 2007 (2007-10-29), discusses uplink control channel payload, based on the codebook size.

The document INTERDIGITAL COMMUNICATIONS ET AL: "E-UTRA PUCCH: ACK/NACK, CQI, PMI, and RI Issues" 3GPP DRAFT; R1-074391, 3RD GENERATION PARTNERSHIP PROJECT (3GPP), MOBILE COMPETENCE CENTRE; 650, ROUTE DES LUCIOLES; F-06921 SOPHIA-ANTIPOLIS CEDEX; FRANCE, vol. RAN WG1, no. Shanghai, China; 20071008, 3 Oct. 2007 (2007-10-03), provides a summary discussion concerning the reporting of CQI, PMI, ACK/NACK and RI on PUCCH.

The document, HUAWEI: "cal and PMI resource management" 3GPP DRAFT; R1-074233, 3RD GENERATION PARTNERSHIP PROJECT (3GPP), MOBILE COMPETENCE CENTRE; 650, ROUTE DES LUCIOLES; F-06921 SOPHIA-ANTIPOLIS CEDEX; FRANCE, vol. RAN WG1, no. Shanghai, China; 20071008, 2 Oct. 2007(2007-10-02), discusses the feedback of channel state information from the UE to the NodeB.

Further, the document ERICSSON ET AL: "Corrections to CQI and RI fields description"3GPP DRAFT; R1-090533 CORRECTIONS TO CQI AND RI FIELDS DESCRIPTION B, 3RD GENERATION PARTNERSHIP PROJECT (3GPP), MOBILE COMPETENCE CENTRE; 650, ROUTE DES LUCIOLES; F-06921 SOPHIA-ANTIPOLIS CEDEX ; FRANCE, no. Ljubljana; 20090112, 12 Jan. 2008 (2008-01-12) is related to corrections of CQI and RI fields description.

SUMMARY

It is one object of embodiments herein to achieve a better utilization of the control channel. This may be achieved by a method for and arrangement adapted for multiplexing rank information (RI) with other valuable control information.

This object is achieved by the methods and arrangements as set forth in the appended independent claims. Specific embodiments are defined by the dependent claims.

According to an aspect, there is provided a method in a first node for sending feedback data on a feedback channel to a second node. The feedback data is indicative of channel properties of a data channel for sending data from the second node to the first node. A wireless MIMO communications system comprises the first and second nodes. The first node sends, in a time period of the feedback channel, feedback data comprising a first rank indicator of the data channel. Furthermore, the first node sends additional data, being independent of the first rank indicator, in the time period.

According to a further aspect, there is provided an arrangement in a first node for sending feedback data on a feedback channel to a second node. The feedback data is indicative of channel properties of a data channel for sending data from the second node to the first node. A wireless MIMO communications system comprises the first and second nodes. The arrangement comprises a sending unit configured to send, in a time period of the feedback channel, feedback data comprising a first rank indicator of the data channel. Furthermore, the sending unit is configured to send additional data, being independent of the first rank indicator, in the time period.

According to another aspect, there is provided a method in a second node for receiving feedback data on a feedback channel from a first node. The feedback data is indicative of channel properties of a data channel for sending data from the second node to the first node. A wireless MIMO communications system comprises the first and second nodes. The second node receives, in a time period of the feedback channel, feedback data comprising a first rank indicator of the data channel. Furthermore, the second node receives additional data, being independent of the first rank indicator, in the time period.

According to a still further aspect, there is provided an arrangement in a second node for receiving feedback data on a feedback channel from a first node. The feedback data is indicative of channel properties of a data channel for sending data from the second node to the first node. A wireless MIMO communications system comprises the first and second nodes. Furthermore, the arrangement comprises a receiving unit configured to receive, in a time period of the feedback channel, feedback data comprising a first rank indicator of the data channel. The receiving unit is further configured to receive additional data, being independent of the first rank indicator, in the time period.

The first node may be a mobile terminal, a communication device, a mobile phone, a PDA, a cellular phone, a portable computer with wireless capabilities, a radio network node, a radio base station, or a similar wireless communication system.

The second node may be a radio network node, a radio base station, a mobile terminal, a communication device, a mobile phone, a PDA, a cellular phone, a portable computer with wireless capabilities, or a similar wireless communication system.

As used herein, the term "independent" is to be understood as meaning that the additional data does not depend on the rank indicator included in the same time period as the additional data. For example, if the rank indicator changes, the additional data may remain the same. Thus, "independent" means that there can not be found a relation between the rank indicator included in the same time period as the additional data. As a consequence, the additional data can not be determined on the basis of the rank indicator included in the same time period as the additional data.

Thanks to the inclusion of additional data, being independent of the first rank indicator, in the same time period as the first rank indicator is located or comprised in, valuable information may be transmitted to the second node without using additional channels. The methods provide for better utilization of channels (or resources) already occupied by feedback data for the current rank and current transmission mode.

Embodiments herein thus imply the advantage to provide a better utilization of scarce control channel resources.

Similar or corresponding features of the arrangement in the first and second nodes provide the same or similar advantages as above.

Further features of, and advantages with, embodiments will become apparent when studying the appended claims and the following description.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
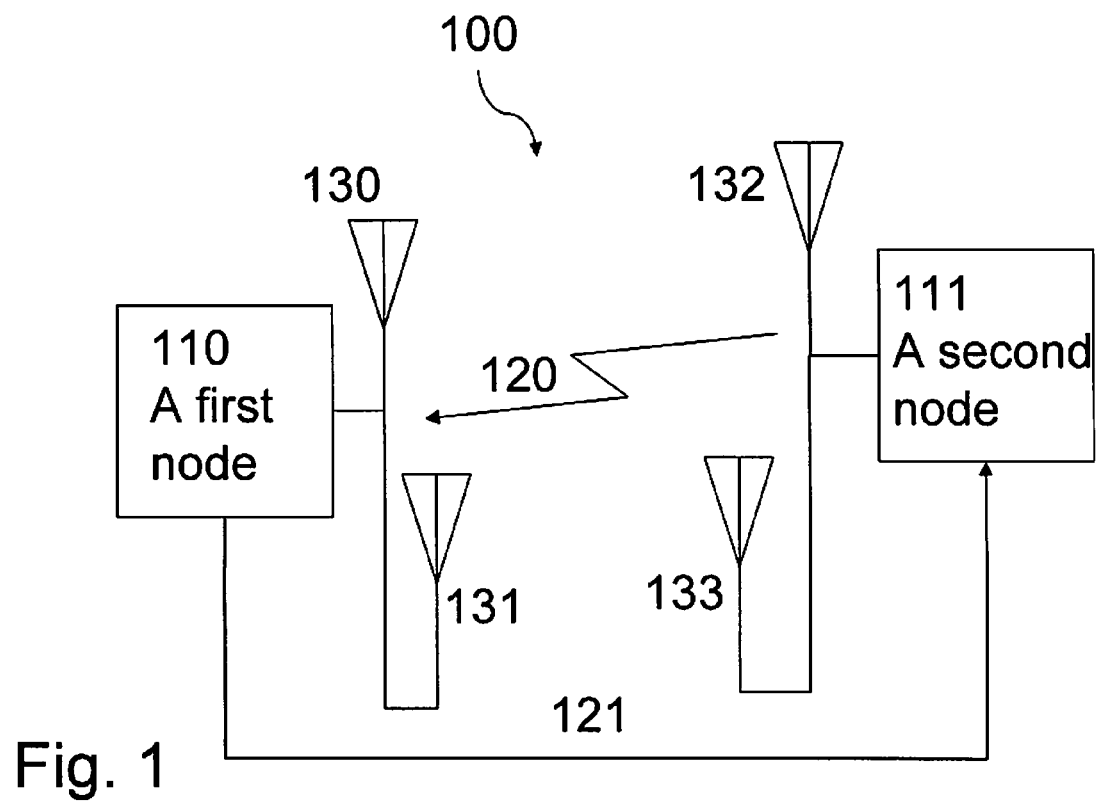
FIG. 1 shows an overview over a wireless MIMO communication system.

As stated above, the control channel is inefficiently used and the indication of rank is transmitted more often than necessarily.

One solution of this problem is to report the rank more seldom than the CQI/PMI. In this sense, all CQI/PMI reports will be relative the last rank report. On the other hand, having just one rank report does not utilize the control channel capacity in the best way as the rank report consists of only a few bits (e.g. two bits if 4×4 MIMO is supported). Also, separating rank and PMI/CQI report can result in several different control channel structures, which might increase the complexity of the receiver.

Assuming that the rank indicator (RI) can have another (e.g. slower) reporting interval than the corresponding CQI/PMI report implies that, for every time instant when a RI report should be sent, the control channel (e.g. PUCCH) will be underutilized.

To rectify this problem, additional information can be attached to the report containing the RI (rank indicator). Attaching the full CQI/PMI report relevant for the reported rank may however lead to excessive overhead (i.e. over-utilization). In addition, it might be beneficial if the content of the additional information does not necessarily depend on the RI, this would for example enable efficient joint coding of RI and the additional information and since the additional information is supposed to be relatively small in size, a sufficiently good coverage of the report containing the RI can still be maintained. The additional information (or data) may, in preferred embodiments, relate to rank indicators, being different from the reported rank indicator RI.

According to a first embodiment of the present invention the RI report is combined with a CQI/PMI report that is valid for rank one transmission. When assuming that the mobile terminal (UE) currently is reporting a supported rank of two, the system does not have information that is valid for a rank one transmission. Normally, the system would use the RI that is reported by the terminal but under certain circumstances the system may want to transmit with a lower rank. This could be, e.g., due to a lack of data in Tx (transmission or transmit) buffers or lack of resources (such as bandwidth or Tx (transmission) power). Hence, by using the "spare" part of the UL (uplink) control channel, which is available when only RI is reported, the system can have information about CQI/PMI suitable for rank one transmissions. Consequently, the method provides for a way to better handle the above mentioned situations.

According to a first working example of the present invention, there is provided a method in a mobile terminal (or a first node) for sending rank indicator reports to a system (a second node) on a control channel (PUCCH) for transmitting RI, CQI and/or PMI of a channel from the system to the mobile terminal, wherein the channel is transmitted with a rank as reported in the rank indicator report sent by the mobile terminal, the method comprising the step of sending the rank indicator report combined with additional information that is independent of the RI on the control channel, wherein the additional information comprises information about a CQI and/or PMI for a rank one transmission. An advantage of this embodiment is that the system may be able to obtain additional information about quality of the data channel for rank one transmission. As previously mentioned, the additional data may be useful if it is desired that the system, i.e. the second node, switches to a transmission of rank one even though the mobile terminal recommends another rank, usually a higher rank.

According to an alternative embodiment of the present invention, CQI valid for Tx diversity transmissions may be attached to the RI report. In this way, the system may be able to mix different types of MIMO transmissions, which may be beneficial for different services. For example, dynamically scheduled data can be transmitted using rank-adaptive and precoded MIMO transmission while persistently scheduled data (e.g. VoIP) can use Tx (transmit) diversity. Time critical and low bit rate data such as VoIP is expensive to support via MIMO transmission, mainly due to the excessive feedback needed for MIMO transmission.

Moreover, the CQI may be associated with other transmission modes, such as closed or open loop spatial multiplexing transmission and/or MU-MIMO (multi-user MIMO). Also, a semi-persistently scheduled service, using e.g. Tx diversity, may benefit by means of improved link adaptation from having access to CQI(s) associated with such other transmission modes since even parts of those transmission modes may have transmission properties resembling those of the semi-persistently scheduled service.

According to a second working example, there is provided a method in a mobile terminal for sending rank indicator reports to a system (a second node) on a control channel (PUCCH) for transmitting RI, CQI and/or PMI of a channel from the system to the mobile terminal, wherein the channel is transmitted with a rank (i.e., number of symbol streams/layers) possibly based on the rank indicator report sent by the mobile terminal, the method comprising the step of sending the rank indicator report and attaching additional information that is independent of the RI thereto on the control channel, wherein the additional information comprises information about a CQI valid for transmit diversity transmissions. This makes it possible to exploit under-utilized feedback control resources for improving the knowledge about the link quality for another transmission mode not currently used on the data channel or used on another data channel/service, e.g. semi-persistently scheduled data using transmit diversity.

With reference to FIG. 1, there is shown a wireless MIMO communication system 100, comprising a first node 110 and a second node 111. For example, the first node 110 may be a mobile terminal, such as a mobile phone or a PDA, and the second node 111 may be a radio base station. The first node 110 comprises two antennas 130, 131 and the second node comprises two antennas 132, 133. In other examples, the nodes 110, 111 may have a different number of antennas than in FIG. 1. If the antennas 130, 131, as in this example, are arranged to transmit and/or receive orthogonally polarized signals, then the rank of the system is two, i.e. the value of the rank indicator is two. This also means that the system may use one or two (data) streams or layers for the transmission of data. The rank indicator determines the maximum number of streams or layers.

When operating the wireless MIMO communication system 100, a data channel 120 for sending data from the second node 111 to the first node 110 is established. In order to provide information about transmission quality of the data channel 120 to the second node 111, a feedback channel 121 for sending information about the quality of the transmission on the data channel 120 is established. Since the second node 111 receives information about the transmission quality, it may adapt, for example, transmission power on the data channel 120 such that the transmission quality is improved.

Again, if it is assumed that the rank indicator (RI) can have another (e.g. slower) reporting interval than the corresponding CQI/PMI report, it is implied that, for every time period when a RI report is sent, there is a risk that the control channel (e.g. PUCCH) will be underutilized.

Figure 2:
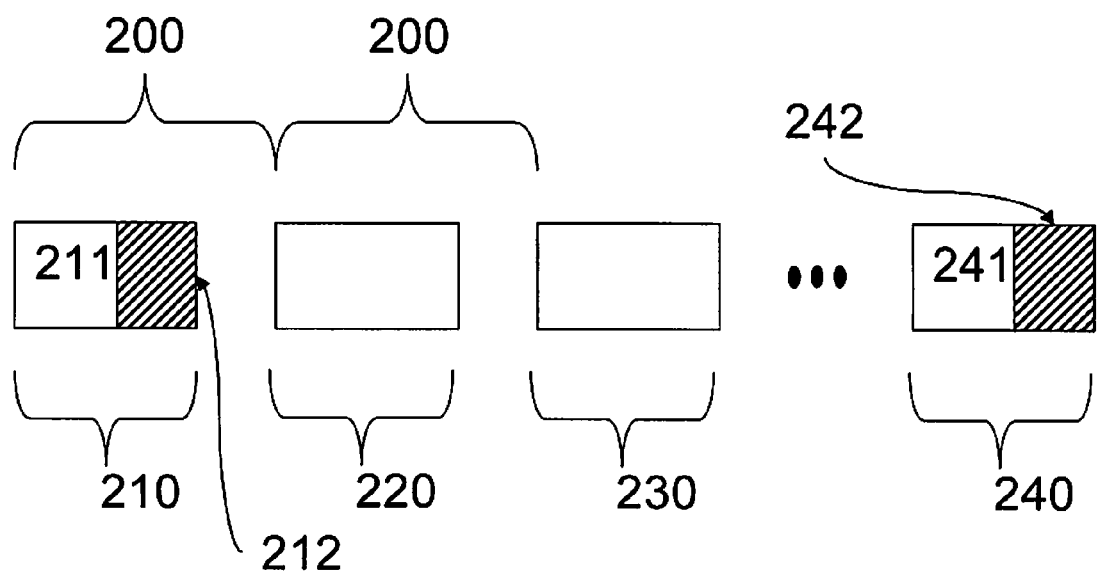
FIG. 2 shows a number of time periods of a signal sent from a first node to a second node, both being comprised in the wireless MIMO communication system according to FIG. 1.

FIG. 2 shows a number of time periods 210, 220, 230, 240, or, using 3GPP LTE terminology, subframes of the feedback channel. The feedback channel in LTE is called Physical Uplink Control Channel (PUCCH). A subframe usually has a duration of 1 ms and the time between beginning of one subframe 210 and beginning of another, subsequent subframe 220 is usually 20 ms. In the example according to FIG. 2, the subframe comprises a first set of data 211 and a second set of data 212. The first set of data 211 may, for example, be a rank indicator. In order to efficiently use the remaining bits of the subframe 210, the second set of data 212 may comprise further information or data. For example, such further information may relate to CQIs and/or PMIs associated with ranks different from the rank indicated in the first set of data 211. In the Figure, it is indicated that the time interval between reporting of rank indicators, see the first and last subframes 210, 240, is longer than the time interval between reporting of CQIs and/or PMIs related to the rank indicator in a preceding subframe or time period 210, see intermediate subframes 220, 230. Since the rank indicator varies more slowly in time than CQIs and PMIs, the rank indicator may be sent less frequent than the CQIs and/or PMIs. In FIG. 2, a rank indicator 241 is sent in subframe 240, further comprising some additional information or data 242. As a consequence, the time periods, containing a rank indicator report, of the feedback channel are used more efficiently, i.e. thanks to the inclusion of additional information in the subframe or time period a larger portion or the entire time period is filled with useful information to be interpreted by the second node 111.

It is preferred that the additional information is independent of the rank indicator sent in the same time period. For example, when sending CQIs and/or PMIs as additional information, these additional CQIs and/or PMIs relate to a rank different from the rank indicated by the rank indicator sent in the same time period as the additional CQIs and/or PMIs.

Figure 3:
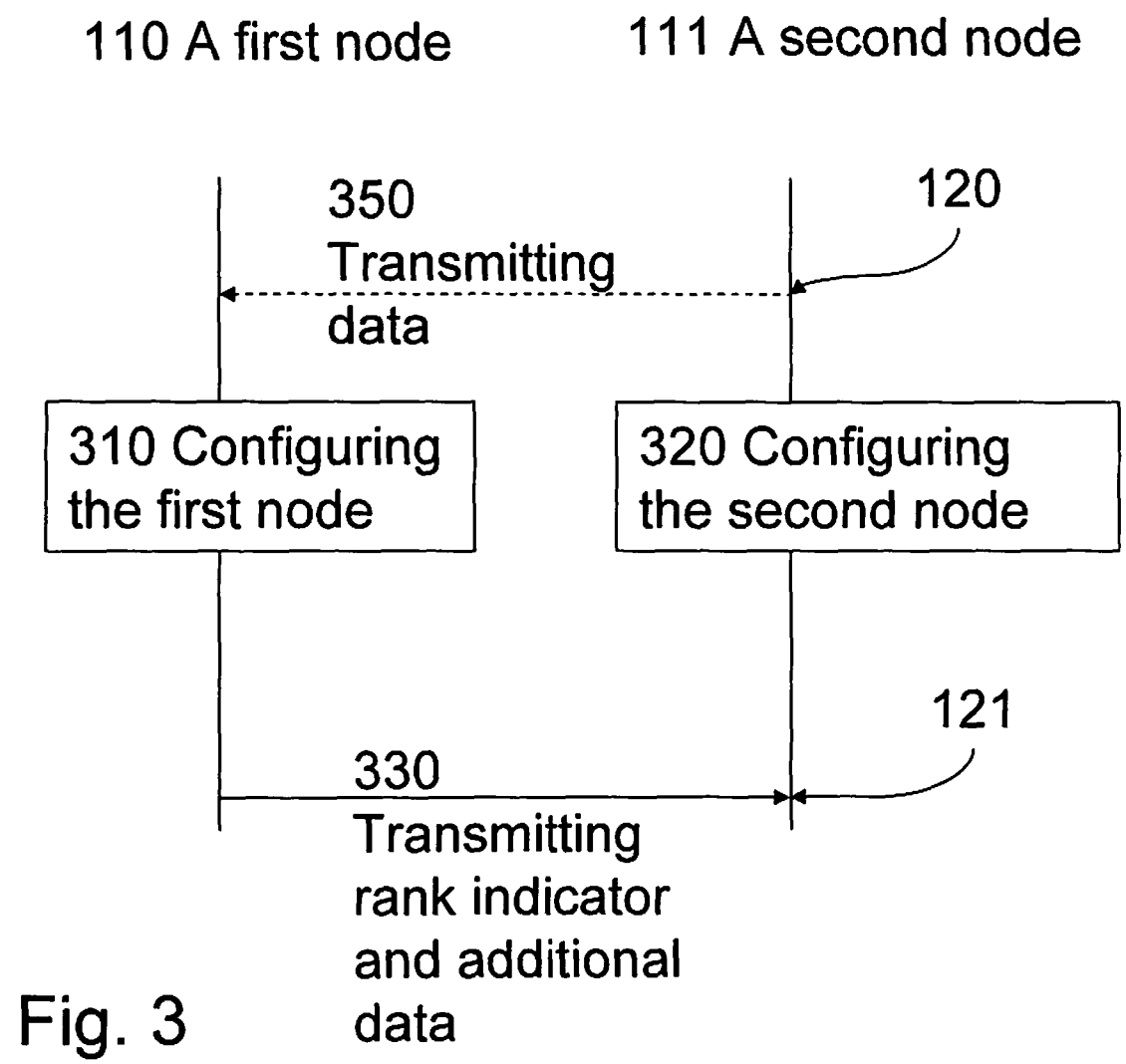
FIG. 3 shows a combined signaling and flowchart of the method according embodiments of the invention.

Referring to FIG. 3, there is shown a combined signaling an flowchart for a method according to embodiments of the present invention in the wireless MIMO communication system as shown in FIG. 1. The following steps are performed in the wireless MIMO communication system:

Step 350 In some embodiments, the second node 111 transmits or sends data to the first node 110 on a data channel 120 using a first transmission mode, such as transmit diversity.

Step 310 In some embodiments, the first node 110 is configured to be able to send additional information in conjunction with the rank indicator in a subframe on the feedback channel 121. This step may also be performed in advance, for example, when adding the first node 110 to the network or when installing software in the first node 110.

Step 320 In some embodiments, the second node 111 is configured to be able to receive additional information in conjunction with the rank indicator in a subframe on a feedback channel 121. This step may also be performed in advance, for example, when adding the second node 111 to the network or when installing software in the second node 111.

Step 330 The first node 110 sends, in a subframe or a time period of the feedback channel 121, feedback data comprising a first rank indicator of the data channel to the second node 111. Furthermore, the first node 110 sends, in the same subframe, additional data being independent of the first rank indicator to the second node 111.

The feedback data is obtained by measuring the quality and properties of the channel corresponding to the data channel as is known in the art. The first node can for example estimate the channel based on pilots (training data) transmitted from the second node. The pilots and the so obtained channel estimate can also be exploited for computing an estimate of the noise plus interference level. From these parameters, SINR (Signal to Interference and Noise Ratio) values for each layer can be computed and then mapped to a suitable transmission rank. The impact of different precoders can also be assessed by means of similar computations and CQI would roughly correspond to the SINR values. The resulting parameters are organized into PMI, CQI and RI and fed back to the second node.

The rank indicator or, more particularly, the value of the rank indicator ranges from one to the maximum number of supportable transmission layers or symbol streams. The rank indicator of an exemplifying wireless communication MIMO-system is discussed further below.

It may be noted that, in this context, the expression "independent" implies that the additional data, such as PMI and/or CQI, relate to a rank different from the rank indicated by the rank indicator sent in the same subframe or time period.

In yet some embodiments of the present invention, the time period 210, 240 may be a subframe of the feedback channel 121, particularly a Physical Uplink Control Channel. A subframe is to be understood as a term defined by SAE/LTE-terminology, i.e. the duration of a subframe is 1 ms.

Figure 4:
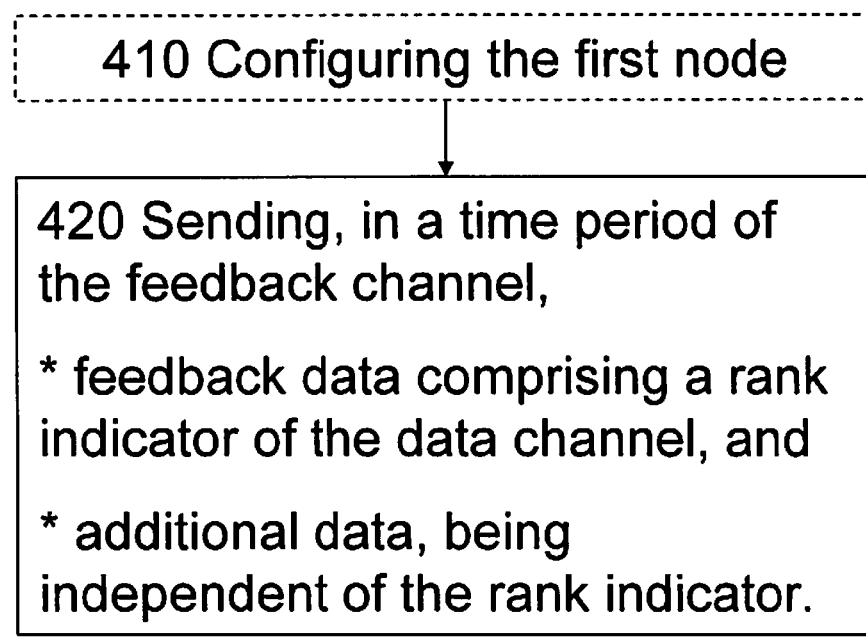
FIG. 4 shows a flowchart of the method in the first node according some embodiments of the invention.

In FIG. 4, there is shown a flowchart of an exemplifying method in the first node 110 for sending feedback data on a feedback channel 121 to a second node 111. The feedback data is indicative of quality of a data channel 120 for sending data from the second node to the first node. A wireless MIMO communications system 100 comprises the first and second nodes 110, 111. The following steps may be performed:

Step 410 In some embodiments of the method in the first node 110, the first node 110 is configured to be able to perform (or handle) sending (or transmission) of additional information (or data) in a subframe or time period of the feedback channel 121, in conjunction with a rank indicator. The dashed frame of step 410 in FIG. 4 indicates that the step is optional.

Step 420 The first node 110 sends, in a subframe of the feedback channel 121, feedback data comprising a first rank indicator of the data channel 120. Furthermore, the first node 110 sends additional data, being independent of the first rank indicator, in the time period.

It may, in embodiments of the method in the first node, be preferred that the first rank indicator and the additional data are jointly encoded. Expressed differently, the first rank indicator is multiplexed with the additional data. In this manner, the rank indicator and the additional data may be compressed, i.e. fewer bits may be used, more efficiently than when the rank indicator and the additional data are encoded individually.

Furthermore, the additional data may comprise a channel quality indicator and/or a precoder matrix indicator. Advantageously, quality information about other channels having another rank than the rank of the data channel may be provided.

In some embodiments of the method in the first node 110, the additional data 212, 242 may be dependent on a second rank indicator, being different from the first rank indicator. Preferably, the second rank indicator represents rank one. For example, if the data channel 120 is using a rank of two, the additional data may comprise information about channel quality indicator and/or precoder matrix for transmission using a rank of one. Normally, the data is transmitted using the reported rank, in this example a rank of two. However, due to lack of resources, as explained above, it may be preferred to use a different rank, in this example a rank of one, which works well even with scarce resources. It is preferred, as in the example above, that the second rank indicator represents rank one.

Moreover, in some embodiments of the method in the first node 110, the data channel 120 may use a first transmission mode with which the first rank indicator is associated and the additional data is associated with channel properties for a transmission over the data channel using a second transmission mode different from the first transmission mode. It may be preferred that the second transmission mode is transmit diversity and the additional data comprises a channel quality indicator (CQI). As explained above, the second node may be able to mix different types of MIMO transmissions, which may be beneficial for different services. For example, dynamically scheduled data may be transmitted using rank-adaptive and precoded MIMO transmission (first transmission mode) while persistently scheduled data (e.g. VoIP, second transmission mode) can use Tx (transmit) diversity. In other examples, the second transmission mode is closed-loop spatial multiplexing or open-loop spatial multiplexing. Thereby, a means for assisting in decision making for switching of transmission modes, i.e. information about channel quality of the transmission mode to be switched to may be obtained, is provided.

Figure 5:
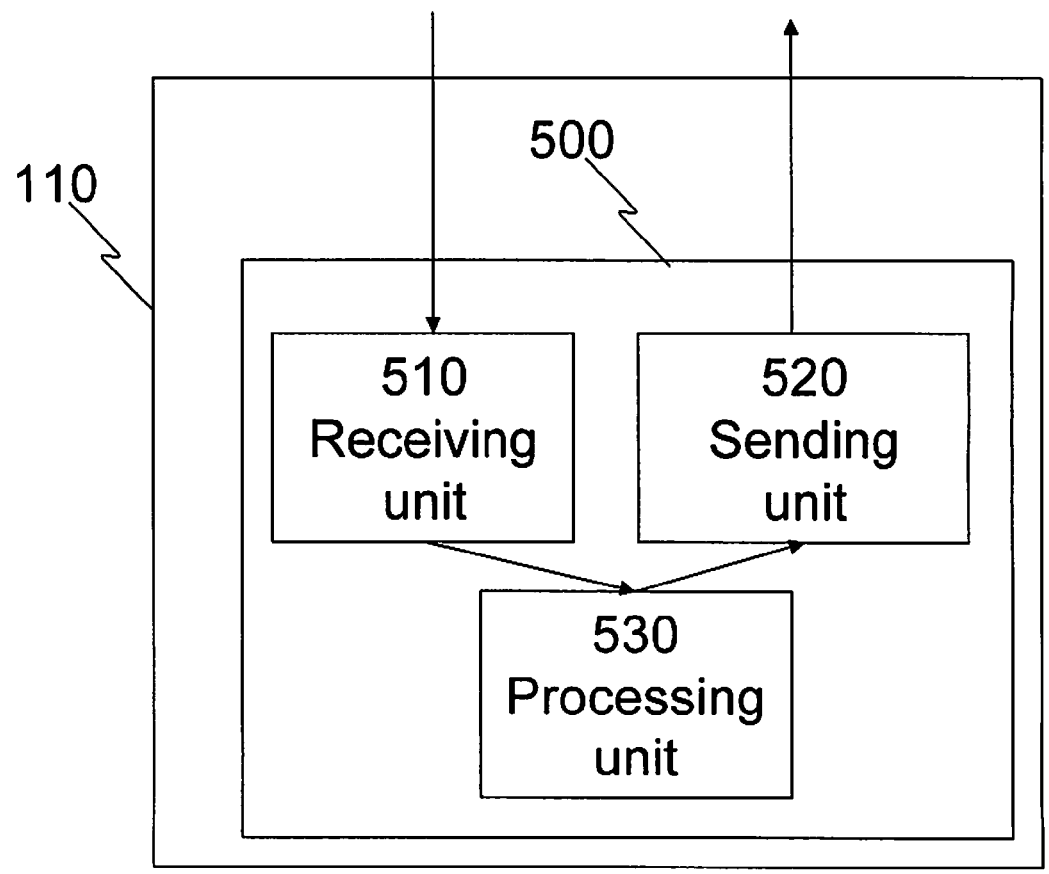
FIG. 5 shows a block diagram of the arrangement in the first node according embodiments of the invention.

In FIG. 5, there is illustrated an exemplifying arrangement 500 in a first node 110 configured to perform the method in the first node 110 as shown in FIG. 4. As shown in the Figure, the first node 110 comprises the arrangement 500. The arrangement 500 is configured to send feedback data on a feedback channel 121 from a first node 110 to a second node 111. The feedback data is indicative of channel properties of a data channel 120 for sending data from the second node 111 to the first node 110. A wireless MIMO communications system 100 comprises the first and second nodes 110, 111. The arrangement 500 comprises a sending unit 520 configured to send, in a time period of the feedback channel 121, feedback data comprising a first rank indicator of the data channel 120. Furthermore, the sending unit 520 is configured to send additional data 212, 242, being independent of the first rank indicator, in the time period.

It may, in embodiments of the arrangement 500 in the first node 110, be preferred that the arrangement 500 is configured to jointly encode the first rank indicator and the additional data. Thereby, providing an advantage similar or same as the advantage of the corresponding method as indicated above.

Furthermore, the additional data may comprise a channel quality indicator and/or a precoder matrix indicator. Similar or same examples and advantages apply for the arrangement in the first node as for the method in the first node as explained above.

In some embodiments of the arrangement 500 in the first node 110, the additional data 212, 242 may be dependent on a second rank indicator, being different from the first rank indicator. Preferably, the second rank indicator represents rank one. Similar or same examples and advantages apply for the arrangement in the first node as for the method in the first node as explained above.

Moreover, in some embodiments of the arrangement 500 in the first node 110, the data channel 120 may use a first transmission mode with which the first rank indicator is associated and the additional data is associated with channel properties for a transmission over the data channel using a second transmission mode different from the first transmission mode. It may be preferred that the second transmission mode is transmit diversity and the additional data comprises a channel quality indicator (CQI). In some embodiments of the arrangement 500, the second transmission mode is closed-loop spatial multiplexing or open-loop spatial multiplexing. Similar or same examples and advantages apply for the arrangement in the first node as for the method in the first node as explained above.

Figure 6:
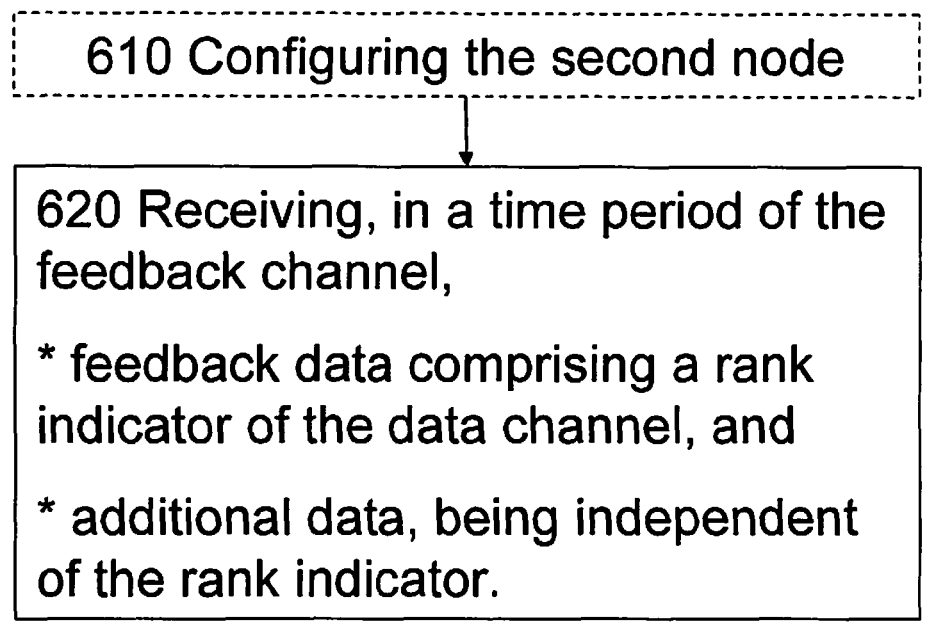
FIG. 6 shows a flowchart of the method in the second node according some embodiments of the invention.

Now with reference to FIG. 6, there is shown a flowchart of an exemplifying method in the second node 111 for receiving feedback data on a feedback channel 121 from the first node 110. The feedback data is indicative of quality of a data channel for sending data from the second node to the first node. A wireless MIMO communications system comprises the first and second nodes 110, 111. The following steps may be performed:

Step 610 In some embodiments of the method in the second node 111, the second node is configured to be able to handle reception of additional data in conjunction with the first rank indicator in a subframe or time period of the feedback channel. The dashed frame indicates that this step is optional.

Step 620 The second node 111 receives, in a subframe or a time period of the feedback channel, feedback data comprising a first rank indicator of the data channel. Furthermore, the first node receives in the same subframe or time period additional data, being independent of the first rank indicator.

It may, in embodiments of the method in the second node 111, be preferred that the first rank indicator and the additional data are jointly decoded, if they were jointly encoded. Expressed differently, the decoder simultaneously searches for the combination of rank indicator and additional data that best fits the received signals.

Again, the additional data may comprise a channel quality indicator and/or a precoder matrix indicator. Similar or same examples and advantages apply for the method in the second node as for the method in the first node as explained above.

In some embodiments of the method in the second node 111, the additional data 212, 242 may be dependent on a second rank indicator, being different from the first rank indicator. Preferably, the second rank indicator represents rank one. A brief discussion regarding advantages and examples is given above.

Moreover, in some embodiments of the method in the second node 111, the data channel 120 may use a first transmission mode with which the first rank indicator is associated and the additional data is associated with channel properties for a transmission over the data channel using a second transmission mode different from the first transmission mode. It may be preferred that the second transmission mode is transmit diversity and the additional data comprises a channel quality indicator (CQI). In some embodiments of the method, the second transmission mode is closed-loop spatial multiplexing or open-loop spatial multiplexing. Again, the same advantages and examples, as for the method in the first node, apply to this embodiment of the method in the second node.

Figure 7:
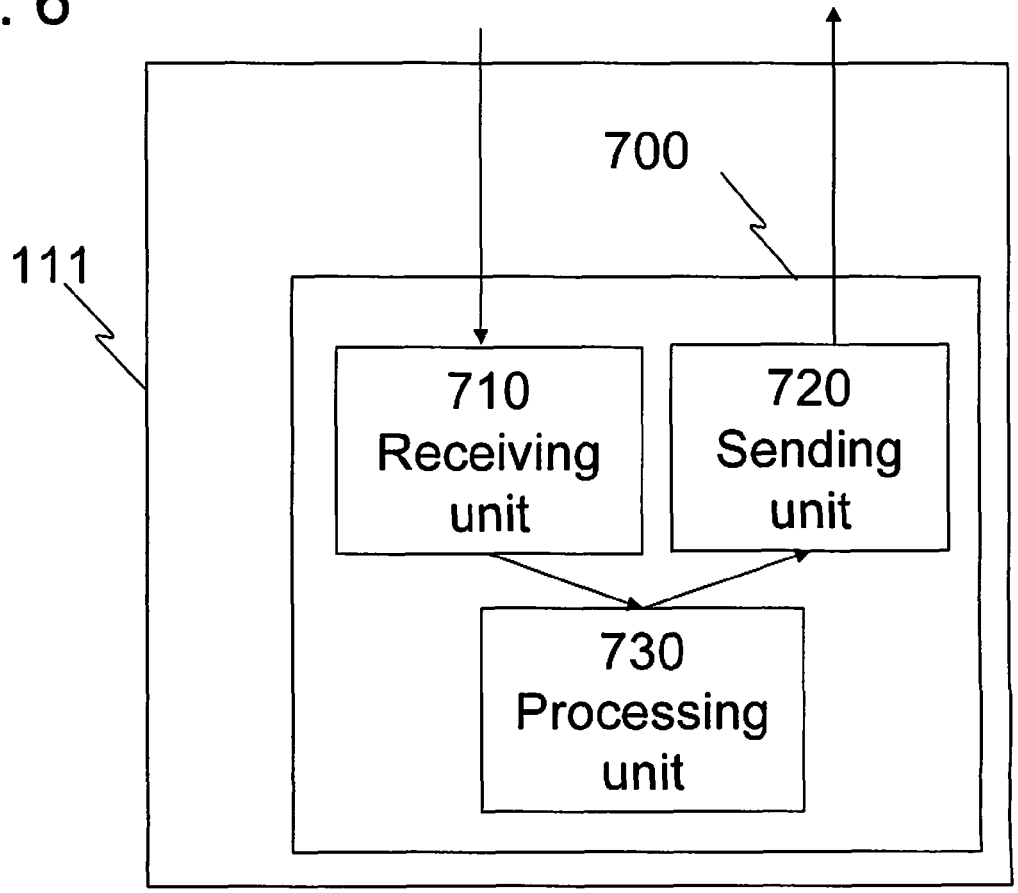
FIG. 7 shows a block diagram of the arrangement in the first node according embodiments of the invention.

In FIG. 7, there is shown an arrangement 700 in a second node 111 configured to receive feedback data on a feedback channel 121 from the first node 110. As shown in FIG. 7, the second node 111 comprises the arrangement 700. The feedback data is indicative of channel properties of a data channel 120 for sending data from the second node 111 to the first node 110. A wireless MIMO communications system 100 comprises the first and second nodes 110, 111. The arrangement 700 comprises a receiving unit 710 configured to receive, in a time period of the feedback channel 121, feedback data comprising a first rank indicator of the data channel 120. Furthermore, the receiving unit 710 is configured to receive additional data 212, 242, being independent of the first rank indicator, in the time period.

It may, in embodiments of the arrangement 700 in the second node 111, be preferred that the first rank indicator and the additional data are jointly decoded, if they were jointly encoded. Expressed differently, the decoder simultaneously searches for the combination of rank indicator and additional data that best fits the received signals.

Furthermore, the additional data may comprise a channel quality indicator and/or a precoder matrix indicator. Similar or same examples and advantages apply for the arrangement in the second node as for the method in the second node as explained above.

In some embodiments of the arrangement 700 in the second node 111, the additional data 212, 242 may be dependent on a second rank indicator, being different from the first rank indicator. Preferably, the second rank indicator represents rank one. Similar or same examples and advantages apply for the arrangement in the second node as for the method in the second node as explained above.

Moreover, in some embodiments of the arrangement 700 in the second node 111, the data channel 120 may use a first transmission mode with which the first rank indicator is associated and the additional data is associated with channel properties for a transmission over the data channel using a second transmission mode different from the first transmission mode. It may be preferred that the second transmission mode is transmit diversity and the additional data comprises a channel quality indicator (CQI). In some embodiments of the arrangement 700, the second transmission mode is closed-loop spatial multiplexing or open-loop spatial multiplexing Similar or same examples and advantages apply for the arrangement in the second node as for the method in the second node as explained above.

It may be noted that the invention is described in the foregoing and following with reference to a SAE/LTE system. It shall, however, be understood that this is not intended to limit the scope of the invention, which is defined by the appended claims. Embodiments may, hence, be applied to any wireless radio MIMO-system.

Those skilled in the art realize that different features of the present invention may be combined to create embodiments other than those described in the following, without departing from the scope of the present invention. Even though the invention has been described with reference to specific exemplifying embodiments thereof, many different alterations, modifications and the like will become apparent for those skilled in the art. The invention, is defined by the appended claims.

Thus, embodiments of the present invention include methods for and arrangements adapted for
- multiplexing rank information (RI) with CQI/PMI reports that is valid for a rank one transmission (regardless of the rank that is indicated by the RI); and/or
- multiplexing rank information (RI) with a CQI that is valid for a Tx diversity transmission.

SUMMARY

To multiplex rank information (RI) with additional information that does not depend on the RI
Enabling efficient joint coding of the RI and the additional information
To multiplex rank information (RI) with CQI/PMI reports valid for a rank one transmission (regardless of the rank indicated by RI)
To multiplex the RI with CQI valid for a Tx diversity transmission.
Abbreviations
RI-Rank Indicator
CQI-Channel Quality Indicator
PMI-Precoding Matrix Indicator
Tx-Transmitter
Tx div-Transmit diversity
MIMO-Multiple Input Multiple Output (antennas)

The invention claimed is:

1. A method in a first node for sending feedback data on a feedback channel to a second node, wherein the feedback data is indicative of channel properties of a data channel for sending data from the second node to the first node, a wireless MIMO communications system comprising the first and second nodes, the method comprising:
sending, in a subframe of the feedback channel, feedback data comprising a first rank indicator of the data channel; and
sending additional data, being independent of the first rank indicator, and being dependent on a second rank indicator, different from the first rank indicator, in the same subframe, wherein the data channel is using a first transmission mode with which the first rank indicator is associated, and the additional data is associated with channel properties for a transmission over the data channel using a second transmission mode different from the first transmission mode, wherein the additional data does not indicate channel properties of the data channel having a rank indicated by the first rank indicator.

2. The method of claim 1, wherein the first rank indicator and the additional data are jointly encoded.

3. The method of claim 1, wherein the additional data is selected from the group consisting of a channel quality indicator and a precoder matrix indicator.

4. The method of claim 1, wherein the second rank indicator represents rank one.

5. The method of claim 1, wherein the second transmission mode is transmit diversity, and the additional data comprises a channel quality indicator.

6. The method of claim 1, wherein the second transmission mode is one of closed-loop spatial multiplexing or open-loop spatial multiplexing.

7. The method of claim 1, wherein the feedback channel is a Physical Uplink Control Channel.

8. The method of claim 1, further comprising: configuring the first node to be able to perform the step of sending feedback data and additional data.

9. An arrangement in a first node for sending feedback data on a feedback channel to a second node, wherein the feedback data is indicative of channel properties of a data channel for sending data from the second node to the first node, a wireless MIMO communications system comprising the first and second nodes, the arrangement comprising:
a sending unit configured to send, in a subframe of the feedback channel, feedback data comprising a first rank indicator of the data channel;
wherein the sending unit is further configured to send additional data, being independent of the first rank indicator, and being dependent on a second rank indicator, different from the first rank indicator, in the same subframe , and wherein the data channel is using a first transmission mode with which the first rank indicator is associated, and the additional data is associated with channel properties for a transmission over the data channel using a second transmission mode different from the first transmission mode, wherein the additional data does not indicate channel properties of the data channel having a rank indicated by the first rank indicator.

10. A method in a second node for receiving feedback data on a feedback channel from a first node, wherein the feedback data is indicative of channel properties of a data channel for sending data from the second node to the first node, a wireless MIMO communications system comprising the first and second nodes, the method comprising:
receiving, in a subframe of the feedback channel, feedback data comprising a first rank indicator of the data channel; and
receiving additional data, being independent of the first rank indicator, and being dependent on a second rank indicator, different from the first rank indicator, in the same subframe , wherein the data channel is using a first transmission mode with which the first rank indicator is associated, and the additional data is associated with channel properties for a transmission over the data channel using a second transmission mode different from the first transmission mode, wherein the additional data does not indicate channel properties of the data channel having a rank indicated by the first rank indicator.

11. The method of claim 10, further comprising jointly decoding the first rank indicator and the additional data.

12. The method of claim 10, wherein the additional data is selected from the group consisting of a channel quality indicator and a precoder matrix indicator.

13. The method of claim 10, wherein the second rank indicator represents rank one.

14. The method of claim 10, wherein the second transmission mode is transmit diversity and the additional data comprises a channel quality indicator.

15. The method of claim 10, wherein the second transmission mode is one of closed-loop spatial multiplexing or open-loop spatial multiplexing.

16. The method of claim 10, wherein the feedback channel is a Physical Uplink Control Channel.

17. The method of claim 10, further comprising: configuring the second node to be able to perform the step of receiving feedback data and additional data.

18. An arrangement in a second node for receiving feedback data on a feedback channel from a first node, wherein the feedback data is indicative of channel properties of a data channel for sending data from the second node to the first node, a wireless MIMO communications system comprising the first and second nodes, the arrangement comprising:
a receiving unit configured to receive, in a subframe of the feedback channel, feedback data comprising a first rank indicator of the data channel; and
wherein the receiving unit is further configured to receive additional data being independent of the first rank indicator, and being dependent on a second rank indicator, different from the first rank indicator, in the same subframe , and wherein the data channel is using a first transmission mode with which the first rank indicator is associated, and the additional data is associated with channel properties for a transmission over the data channel using a second transmission mode different from the first transmission mode, wherein the additional data does not indicate channel properties of the data channel having a rank indicated by the first rank indicator.

* * * * *